United States Patent [19]
Nakanishi et al.

[11] Patent Number: 5,696,621
[45] Date of Patent: Dec. 9, 1997

[54] SCANNING LENS SYSTEM AND OPTICAL SCANNING APPARATUS USING THE SAME

[75] Inventors: Hiroshi Nakanishi, Tokyo; Hiroshi Saito, Kawasaki, both of Japan

[73] Assignee: Canon Kabushiki Kaisha, Tokyo, Japan

[21] Appl. No.: 392,213

[22] Filed: Feb. 22, 1995

[30] Foreign Application Priority Data

Feb. 22, 1994 [JP] Japan ................................. 6-049735
Feb. 3, 1995 [JP] Japan ................................. 7-039341

[51] Int. Cl.$^6$ ........................... G02B 26/08; G02B 13/18
[52] U.S. Cl. ........................ 354/298; 359/719; 359/223
[58] Field of Search ........................... 359/719, 668, 359/212, 223, 298

[56] References Cited

U.S. PATENT DOCUMENTS

| | | | |
|---|---|---|---|
| 4,668,056 | 5/1987 | Braat et al. ........................ | 350/432 |
| 5,087,115 | 2/1992 | Ishibai et al. ...................... | 359/719 |
| 5,162,949 | 11/1992 | Kubota ............................. | 359/719 |
| 5,329,406 | 7/1994 | Nakanishi et al. ................. | 359/811 |
| 5,371,632 | 12/1994 | Naiki et al. ....................... | 359/719 |
| 5,384,659 | 1/1995 | Shikama et al. .................... | 359/714 |
| 5,467,225 | 11/1995 | Manabe ............................. | 354/661 |

*Primary Examiner*—Mark Hellner
*Attorney, Agent, or Firm*—Fitzpatrick, Cella, Harper & Scinto

[57] ABSTRACT

A scanning lens system includes a lens having two lens surfaces. The center thickness of the lens is varied in conformity with the error of the curvatures of the two lens surfaces. When the radii of curvature of the lens surfaces on a light deflector side and a surface to be scanned side in the sub-scanning cross-section are $R_a$ and $R_b$, respectively, and the center thickness of the lens is d and the reflective index of the material of the lens for a wavelength $\lambda$ used is N, constant K is obtained by $K=(1/R_a-1/R_b)+(N-1)d/(NR_aR_b)$. The center thickness d of the lens is varied in conformity with the radii of curvature $R_a$ and $R_b$ so that the constant value K may be within ±2% relative to a reference value.

14 Claims, 5 Drawing Sheets

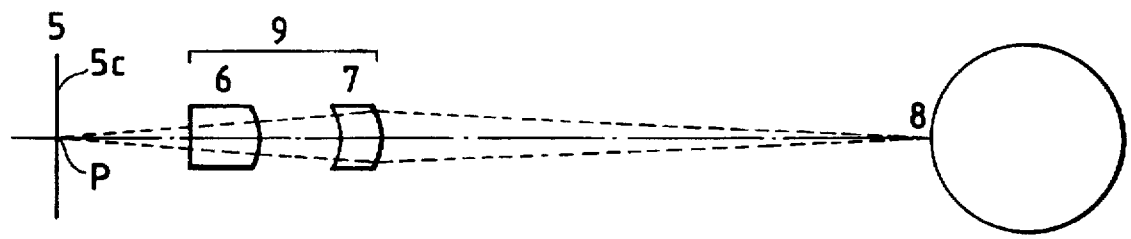
FIG. 2
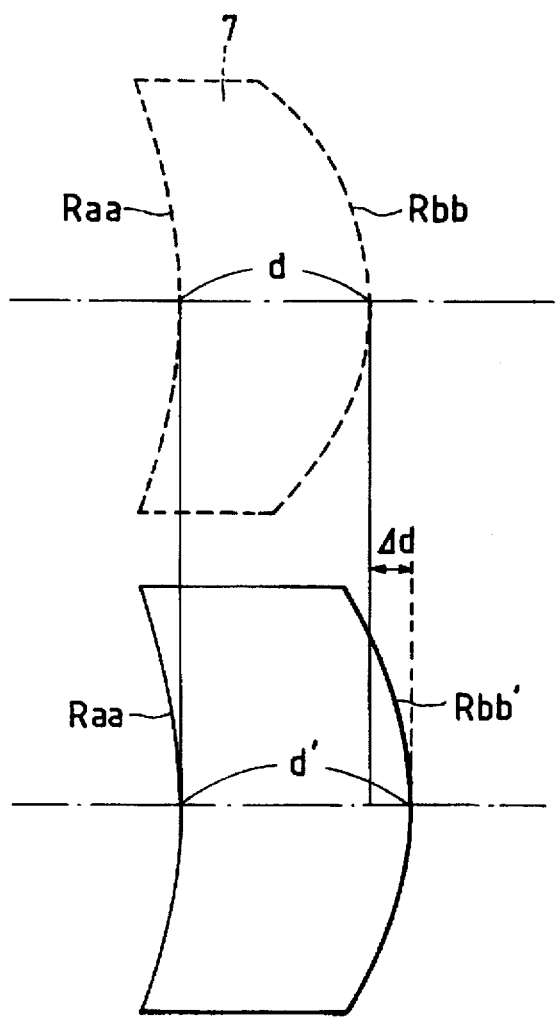
FIG. 3A
FIG. 3B

SCANNING LENS SYSTEM AND OPTICAL SCANNING APPARATUS USING THE SAME

BACKGROUND OF THE INVENTION

1. Field of the Invention

This invention relates to a scanning lens system and an optical scanning apparatus using the same, and particularly to a scanning lens system suitable for use in an apparatus such as a laser beam printer, a color laser beam printer or a multilaser beam printer having an electrophotographic process in which a surface to be scanned which is an image bearing member such as a photosensitive member or an electrostatic recording member is optically scanned by a light-modulated beam of light to thereby form an image, and to an optical scanning apparatus using the same.

2. Related Background Art

In an optical scanning apparatus such as a laser beam printer, a beam of light from a light source is condensed into the form of a line by an imaging optical system having a collimator lens or a cylindrical lens and is imaged on the deflecting surface of a light deflector comprising a rotatable polygon mirror, a single-surface mirror or the like. The beam of light deflected by the light deflector is then caused to enter a scanning lens system having the f-θ characteristic which is constructed by the use of an anamorphic lens such as a toric lens or a cylindrical lens, and is directed onto the surface of an image bearing member through the scanning lens system to thereby form a light spot.

The light deflector is then rotated or vibrated and the surface of the image bearing member is optically scanned to thereby effect the writing of image information or the like.

The scanning lens system is designed such that in the sub-scanning cross-section thereof, the deflectively reflecting surface of the light deflector and the surface of the image bearing member are in optically substantially conjugate relationship with each other. Thereby, the correction of the surface inclination of the deflectively reflecting surface of the light deflector is effected.

A scanning lens system in an optical scanning apparatus according to the prior art has strong refractive power in the sub-scanning cross-section thereof as compared with the main scanning cross-section thereof because the correction of the surface inclination of the deflecting reflecting surface of the light deflector thereof is effected. Also, the scanning lens system is used in a magnifying system and therefore, the curvature accuracy of each lens surface constituting the scanning lens system in the sub-scanning cross-section is severe as compared with the main scanning direction.

When a plastic mold lens or a glass mold lens manufactured by molding by the use of a mold is used as a lens constituting the scanning lens system, the curvature accuracy of the lens surface thereof is determined by the manufacturing accuracy of the cavity insert block with mirror surface. This has led to the problem that it becomes difficult to manufacture a cavity insert block with mirror surface having a lens surface (mirror surface) of a shape in which the curvature has been made sharp in order to enhance refractive power and the irregularity of the curvature of the lens surface becomes great.

Also, even if the cavity insert block with mirror surface could be manufactured as per the working target value thereof, a lens manufactured by effecting plastic molding or glass molding will not mold-contract as per the design value and as a result, the curvature of the lens surface may come off an allowable value.

This tendency becomes great particularly when molding a lens having the curvature of the lens surface thereof made sharp in order to obtain high refractive power. This has led to the problem that a cavity insert block with mirror surface must be made anew each time the manufacturing error comes off the tolerance.

However, each individual mold and cavity incert block with mirror surface is very expensive and also, when lenses are to be mass-produced, a number of molds are required and therefore it will become very costly to remake all of the cavity insert block with mirror surface of which the manufacturing accuracy has come off the tolerance.

SUMMARY OF THE INVENTION

The present invention has as its object the provision of a scanning lens system in which the center thickness of a lens or the position of the lens surface thereof is appropriately set in conformity with the curvature of the lens surface finished when a lens constituting the scanning lens system is manufactured by plastic molding or glass molding, whereby the curvature accuracy of the lens surface is alleviated and also a high optical performance is easily obtained, and an optical scanning apparatus using the same.

The scanning lens system of the present invention comprises a lens having two lens surfaces, and is characterized in that said lens has its lens center thickness varied in conformity with the error of the curvatures of said two lens surfaces.

The scanning lens system of the present invention comprises a lens manufactured by molding by the use of a mold, and is characterized in that said lens has its lens center thickness varied in conformity with the error of the curvatures of the lens surfaces thereof.

The optical scanning apparatus of the present invention is an optical scanning apparatus designed to deflect a beam of light from a light source by a light deflector, and thereafter direct the light beam onto a surface to be scanned through a scanning lens system to thereby optically scan the surface to be scanned, characterized in that said scanning lens system has a regulation lens having its center thickness or its lens surface position varied in conformity with the curvature errors of the two lens surfaces thereof.

Also, said scanning lens system is characterized in that in the sub-scanning cross-section thereof, the deflectively reflecting surface of said light deflector and said surface to be scanned are optically substantially conjugate with each other and said regulation lens is manufactured by molding.

Also, said scanning lens system is characterized in that when the radii of curvature of the lens surfaces of said regulation lens on said light deflector side and said surface to be scanned side in the sub-scanning cross-section are Ra and Rb, respectively, and the center thickness of the lens is d and the reflective index of the material of the lens for a wavelength λ used in N and a constant K is put as $$K = \left( \frac{1}{Ra} - \frac{1}{Rb} \right) + \frac{(N-1)d}{N \times Ra \times Rb},$$

the center thickness d is varied in conformity with the radii of curvature Ra and Rb so that the constant K may be within ±2% relative to a reference value.

Also, said scanning lens system is characterized in that when the radii of curvature of the lens surfaces of said regulation lens on said light deflector side and said surface to be scanned side in the sub-scanning cross-section are Ra and Rb, respectively, the following condition is satisfied:

$$0.0004 < \left| \frac{1}{Ra \times Rb} \right| < 0.04$$

BRIEF DESCRIPTION OF THE DRAWINGS

FIG. 2 is a schematic view of the essential portions in the sub-scanning cross-section of a portion of FIG. 1.

FIGS. 3A and 3B are illustrations of the regulation lens of FIG. 1.

DESCRIPTION OF THE PREFERRED EMBODIMENTS

Figure 1:
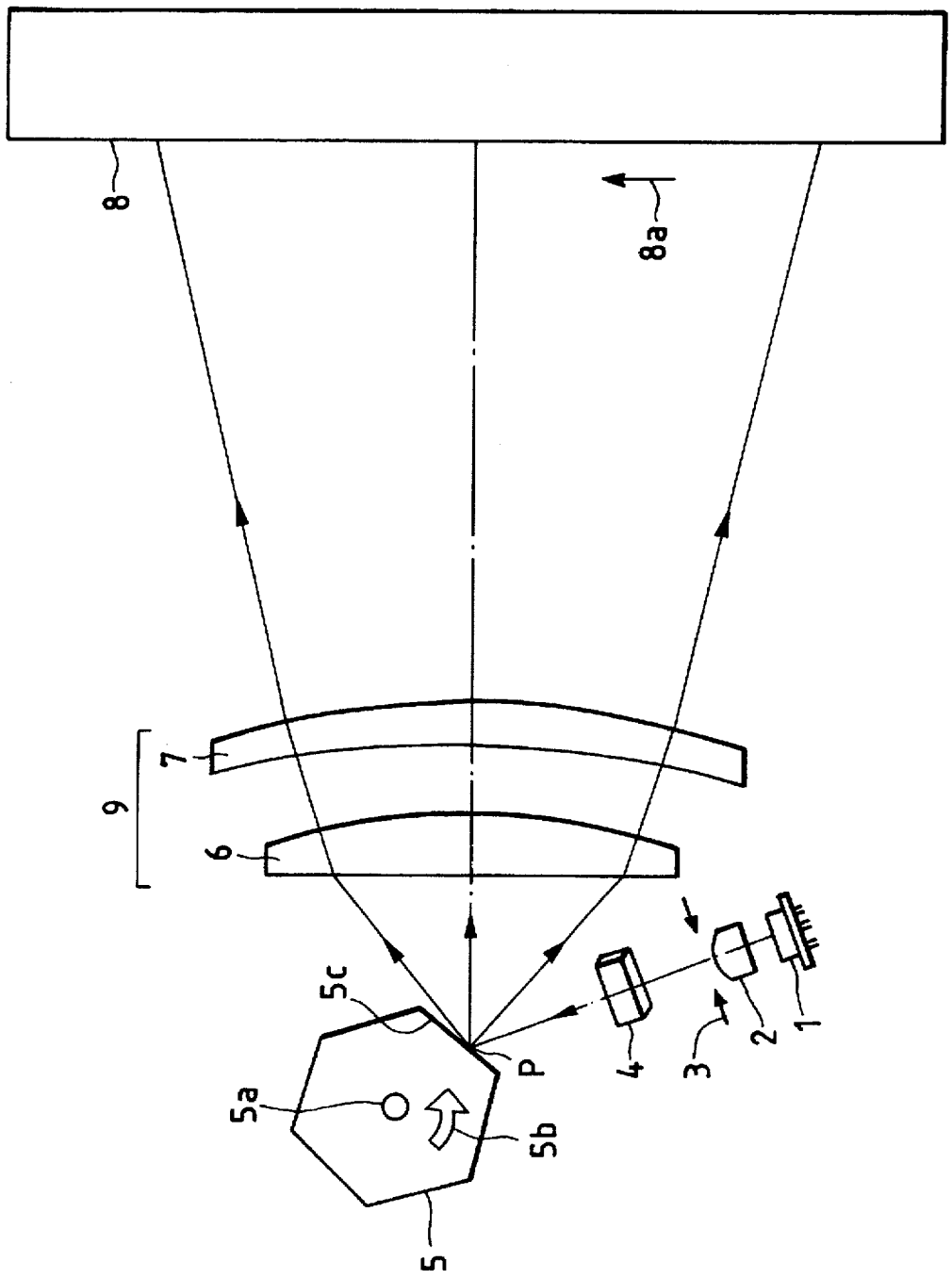
FIG. 1 is a schematic view of the essential portions in the main scanning cross-section of Embodiment 1 of an optical scanning apparatus used in the laser beam printer of the present invention.

FIG. 1 is a schematic view of the essential portion in the main scanning cross-section of Embodiment 1 of an optical scanning apparatus used in the laser beam printer of the present invention, and FIG. 2 is a schematic view of the essential portion in the sub-scanning cross-section of a portion of FIG. 1.

The main scanning cross-section refers to a light beam surface that is formed by a beam of light deflectively scanned by deflecting means with the lapse of time, and the sub-scanning cross-section refers to a cross-section containing the optical system of a scanning lens system and perpendicular to the above-described main scanning cross-section.

In FIGS. 1 and 2, reference numeral 1 designates, for example, a semiconductor laser as light source means. Reference numeral 2 denotes a collimator lens which collimates a beam of light emitted from the light source means 1. Reference numeral 3 designates a stop which controls the diameter of the beam of light emerging from the collimator lens 2. Reference numeral 4 denotes a cylindrical lens which does not have refractive power with respect to the main scanning cross-section, but has predetermined refractive power with respect to the sub-scanning cross-section.

Reference numeral 5 designates a light deflector comprising, for example, a rotatable polygon mirror as deflecting means, and being rotated in the direction of arrow 5b about a shaft 5a at a predetermined speed by a motor (not shown). Reference numeral 9 denotes a scanning lens system having a spherical lens 6 of positive refractive power and a toric lens 7 as a regulation lens having strong refractive power in the sub-scanning cross-section as compared with the main scanning cross-section and formed by plastic molding. The spherical lens 6 and the toric lens 7 together constitute an f-θ system. Reference numeral 8 designates a photosensitive drum which is a recording medium as a surface to be scanned.

In the present embodiment, the beam of light modulated, for example, on the basis of image information, which is emitted from the light source means 1 is made into a substantially parallel beam of light by the collimator lens 2. This parallel beam of light then has its beam diameter adjusted by the stop 3, whereafter in the main scanning cross-section, it is kept as a parallel beam of light by the cylindrical lens 4 and, it is condensed in the sub-scanning cross-section, and is linearly imaged on the deflectively reflecting surface 5c of the light deflector 5. The beam of light in the form of a line is then deflected and reflected by the deflectively reflecting surface 5c.

The beam of light deflectively reflected by the light deflector 5 passes through the scanning lens system 9, whereby its scanning linearity is corrected, and is imaged on the surface of the photosensitive drum 8 and optically scans over the surface of the photosensitive drum 8 by substantially equal speed rectilinear motion. The deflectively reflecting surface of the light deflector 5 is in such a relation that it is imaged on the photosensitive drum 8 at a lateral magnification 2 by the scanning lens system 9.

In FIG. 1, the letter P designates the reflecting surface position of the deflectively reflecting surface 5c, and design is made such that in the sub-scanning cross-section, the beam of light is condensed substantially at this reflecting surface position P as previously described.

The reflecting surface position P and the photosensitive drum 8 are in optically substantially conjugate positional relationship with respect to the scanning lens system 9. Thus, even if the deflectively reflecting surface 5c is inclined in the sub-scanning cross-section, that is, there is a so-called surface inclination, the beam of light may be imaged on the same scanning line on the surface of the photosensitive drum 8. In this manner, the correction of the surface inclination of the light deflector 5 is effected in the present embodiment.

In the present embodiment, the toric lens 7 has strong refractive power in the sub-scanning cross-section in order to keep the optically conjugate relation between the light deflector 5 and the surface of the photosensitive drum 8 and is of a meniscus shape having its convex surface facing the image plane side in order to correct curvature of image field resulting from scanning.

In order to have predetermined refractive power like this, the curvature of the convex surface of the toric lens 7 is made sharp. The toric lens 7 is manufactured by plastic (or glass) molding and therefore, if the curvature of its lens surface becomes sharp, the working of a cavity insert block with mirror surface and the molding work will become difficult and an error will occur to the curvature of the formed lens surface.

In the present embodiment, the scanning lens system 9 is used as a magnifying system and therefore, the movement of the focus on the surface of the photosensitive drum 8 for a variation in the curvature of the toric lens 7 is great. Therefore, the tolerance of the curvature of the toric lens is severe.

So, in the present embodiment, the lens center thickness or the lens surface position of the toric lens 7 is adjusted correspondingly to a variation in the radius of curvature caused by the condition of manufacture in the toric lens 7 in the meridian direction thereof so that the conjugate relation between the light deflector 5 and the surface of the photosensitive drum 8 may not deviate.

FIGS. 3A and 3B are illustrations when the lens center thickness of the toric lens 7 at this time is controlled. In these figures, the sub-scanning cross-section is shown.

When due to the condition of finish of the mold, the curvature of the convex surface becomes weaker from a design value Rbb to Rbb' as shown, for example, in FIG. 3B, the lens center thickness is increased from a design value d to d' to thereby control the refractive power so that the deflectively reflecting surface 5c and the surface of the photosensitive drum 8 may be in an optically conjugate relation with each other.

Generally, as compared with a variation in the radius of curvature, a variation in refractive power caused by a variation in the lens center thickness is small and therefore, minute adjustment of refractive power becomes easy. In the present embodiment, the toric lens 7 is of a lens shape in which the refractive power in the main scanning cross-section becomes weak so that the fluctuation of the focus in the main scanning cross-section may become small relative to the adjustment of the lens center thickness in the sub-scanning cross-section.

Also, in the present embodiment, the toric lens 7 is made into a meniscus shape in order to give substantially the same amount of variation in refractive power to the main scanning cross-section and the sub-scanning cross-section.

Figure 6:
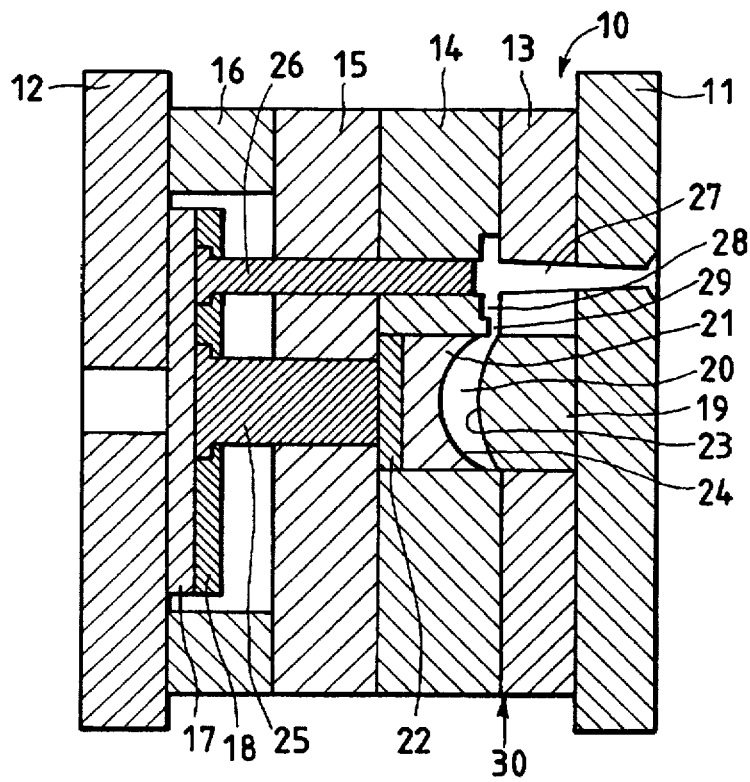
FIG. 6 is an illustration of a mold for molding the regulation lens according to the present invention.
Figure 7:
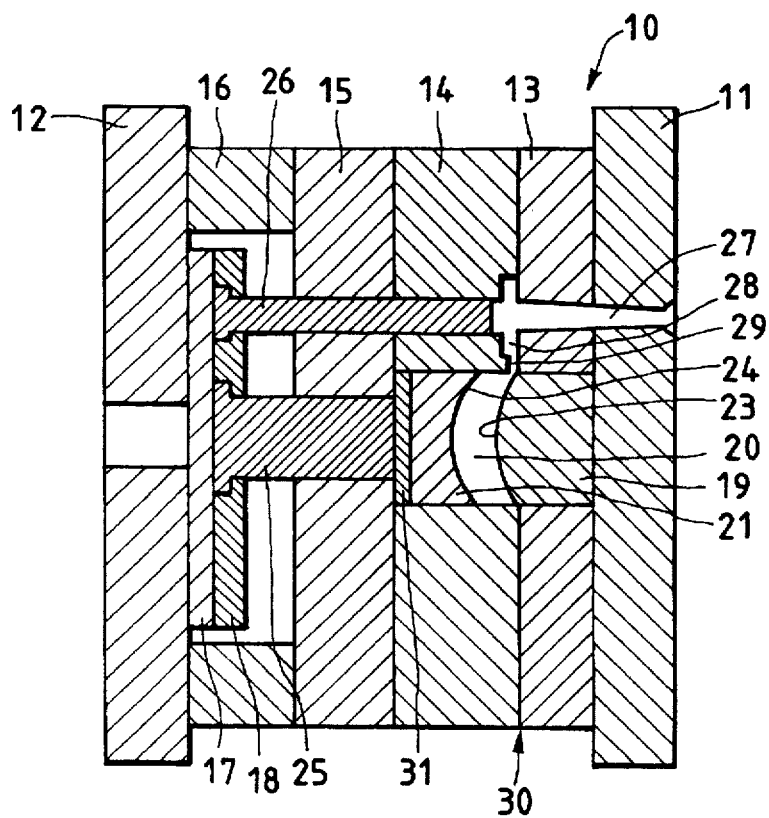
FIG. 7 is an illustration of a mold for molding the regulation lens according to the present invention.

FIGS. 6 and 7 are cross-sectional views of the essential portions of a mold 10 when the toric lens 7 is plastic-molded in the present embodiment.

In FIGS. 6 and 7, reference numeral 11 designates a fixed side mounting plate, reference numeral 12 denotes a movable side mounting plate, reference numeral 13 designates a fixed side mold plate, reference numeral 14 denotes a movable side mold plate, reference numeral 15 designates a pressure receiving plate, reference numeral 16 denotes a spacer block, and reference numerals 17 and 18 designate ejector plates. Reference numeral 19 denotes a fixed side cavity insert block with mirror surface, and reference numeral 21 designates a movable side cavity insert block with mirror surface, and molding surfaces denoted by 23 and 24 are mirror finished surfaces so as to mold the optical surfaces of the toric lens 7 which is a molded article. Specifically, the molding surface 23 is the lens surface Raa of FIG. 3A, and the molding surface 24 is the lens surface Rbb of FIG. 3A.

The space 20 between molding surface 23 of the fixed side cavity insert block with mirror surface 19 and the molding surface 24 of the movable side cavity insert block with mirror surface is a cavity, and a resin material filling this cavity 20 is molded to provide the toric lens 7 (FIG. 3A).

The mold 10 as described above is mounted between the platens (not shown) of an injection molding machine and is brought into a closed state, and resin is heated and melted in an injection cylinder (not shown) and is injected into the mold 10. The resin passes through a sprue 27, a runner 28 and a gate 29 and fills the cavity 20. Thereafter, the resin is cooled and the mold is divided by a parting surface 30, and the ejector plates 17 and 18 are pushed by the ejector rod (not shown) of the molding machine, whereby a molded article 20 and the sprue 27 are protruded from the mold through ejector pins 25 and 26. Thereafter, the gate 29 is cut by a hot knife or the like, whereby the toric lens 7 is finished.

When, as previously described, the R-shape of the convex lens surface side, i.e., the molded surface 24 of the movable side cavity insert block with mirror surface 21 which is a concave frame in the mold, becomes blunt due to the mold working, the lens center thickness is increased to thereby vary the power of the lens so that the conjugate relation may become constant.

In that case, the thickness of a spacer (liner) 31 located behind the movable side cavity insert block with mirror surface 21 as shown in FIG. 7 is made smaller to thereby widen the spacing between the molding surfaces 23 and 24, whereby a lens of a great lens center thickness (FIG. 3B) is easily molded.

Also, with regard to a case where the curvature, for example, of the lens surface Rb side becomes blunt due to molding even if in mold working, the cavity insert blocks with mirror surface 19 and 21 are formed as per the working target values, the lens center thickness is increased to thereby vary the power of the lens so that the optically conjugate relation may become constant.

In that case, instead of a spacer (liner) 22 shown in FIG. 6, a spacer (liner) 31 of a small lens center thickness shown in FIG. 7 is incorporated into the mold 10 shown in FIG. 6, whereby the spacing between the molding surfaces 23 and 24 is widened and a lens of a great lens center thickness shown in FIG. 3B is molded.

In the present embodiment, the optically conjugate relation between the deflectively reflecting surface in the sub-scanning cross-section and the surface of the photosensitive drum is maintained well, and when the radii of curvature of the lens surfaces of the toric lens 7 on the light deflector side and the surface to be scanned side in the sub-scanning cross-section are Ra and Rb, respectively, and the lens center thickness is a and the refractive index of the material is N and a constant is K is put as $$K = \left( \frac{1}{Ra} - \frac{1}{Rb} \right) + \frac{(N-1)d}{N \times Ra \times Rb} , \quad (1)$$

the center thickness d is varied in conformity with the radii of curvature Ra and Rb so that the constant K may be within ±2% relative to a reference value.

That is, the lens center thickness d is adjusted so that the constant K may be within ±2% relative to a target value (reference value), whereby there is provided a scanning lens system excellent in optical performance.

Generally, when the lens center thickness d is varied by a thickness Δd, a variation Δφ in refractive power is $$\Delta\phi = \frac{(N-1)^2 \cdot \Delta d}{N \times Ra \times Rb} . \quad (2)$$

If here, $$\frac{1}{Ra \times Rb}$$

is too great, the variation in refractive power by the lens center thickness d will become great and the adjustment thereof will become difficult.

If conversely, $$\frac{1}{Ra \times Rb}$$

becomes small even if the lens center thickness d is varied, the variation in refractive power will be too small and the adjustment thereof will become difficult.

So, in the present embodiment, when the radii of curvature of the lens surfaces of the toric lens 7 in the light deflector side and the surface to be scanned side in the sub-scanning cross-section are Ra and Rb, respectively, design is made such that the following condition is satisfied:

$$0.0004 < \left| \frac{1}{Ra \times Rb} \right| < 0.04 \quad (3)$$

Thereby, the adjustment of the refractive power is made easy.

Here, specifically, the radii of curvature of the lens surfaces and the lens center thickness have been varied as follows.

The toric lens 7 in FIG. 3A is designed with Raa=−12.617 mm, Rbb=−10.165 mm, the lens center thickness d=5.1 mm and the refractive index N of the material as N=1.57228 (λ=780 mm, polycarbonate resin).

Raa and Rbb are expressed with minus (−) sign. In the case of the toric lens, the light flux enters from Raa surface and emerges from the Rbb surface. This light incident direction is represent as "−" and the emerging direction is represent as "+". The both surfaces Raa and Rbb curve toward "−" direction (light incident side) as the light flux is apart from the optic axis.

Here, consider a case where due to the condition of finish of the mold, the radius of curvature of the convex surface has become as weak as Rbb'=−10.200 mm as shown in FIG. 3B.

In that case, the lens center thickness d' has been increased by 0.146 mm to d'=5.246 mm and the refractive power of the lens has been controlled so that the light deflectively reflecting surface 5c and the surface of the photosensitive drum 8 may be in an optically conjugate relation with each other.

This is achieved by making the thickness of the spacer (liner) 31 in FIG. 7 smaller by 0.146 mm than the thickness of the spacer (liner) 22 in FIG. 6.

This is because on the basis of the aforementioned expression (1), in the case of the original design value (FIG. 3A), $$K = \left( \frac{1}{-12.617} - \frac{1}{-10.165} \right) + \frac{(1.57228-1) \times 5.1}{1.57228 \times (-12.617) \times (-10.165)} = 0.0336$$

and therefore, in the case of FIG. 3B, assuming that $$0.0336 = \left( \frac{1}{-12.617} - \frac{1}{-10.200} \right) + \frac{(1.57228-1) \times d'}{1.57228 \times (-12.617) \times (-10.200)}$$

when d' is found so as to provide the same value of K, d'=5.246 mm.

Generally, in the injection molding of plastic as shown in FIG. 7 (as in glass molding), the manufacturing error of the lens center thickness d during molding differs from that of a polished lens of glass.

Taking a lens of the design lens center thickness d=5.1 mm as an example, it is possible to control the manufacturing error of the lens center thickness d during molding to 0.01–0.03 mm.

This manufacturing error of 0.01–0.03 mm during molding occurs due to the working error of the thickness of the spacer (liner) 22 (31) and the irregularity of molding (specifically, the injection pressure of the resin material, a variation in the temperature of the mold, etc.).

Also in the case of glass molding, a manufacturing error during molding likewise occurs due to variations in the pressure of the press, the temperature of the mold, etc.

In contrast, when as in the present invention, the lens center thickness d is positively varied in conformity with the error of the curvature of the lens surface to thereby effect correction, the amount of variation in the lens center thickness d takes place in the order of 0.05–0.5 mm in the case of a lens of the design lens center thickness d=5.1 mm. The amount of variation in the lens center thickness d when correction is effected for the error of the curvature of such a lens surface differs in the level of order from the above-described manufacturing error 0.01–0.03 mm of the lens center thickness d occurring during molding.

Conversely speaking, the thickness difference of 0.01–0.03 mm occurring for the manufacturing error during molding, if converted into a variation in the radius of curvature R of the lens surface, is equal to or less than Newton ring 0.3 (at d-ray λ=587.56 mm and measurement width 3 mm), and this is simply within the tolerance of the irregularity of the optical performance.

This thickness difference occurring for the manufacturing error during molding differs fundamentally from that obtained by the lens center thickness being positively varied to 0.05–0.5 mm in order to correct a reduction in the optical performance attributable to the fact that the radius of curvature R of the desired lens surface is not obtained.

This will hereinafter be specifically described by the use of the aforementioned expression (1).

Let it be assumed that for example, the lens center thickness d=5.1 mm has been varied by 0.03 mm to provide 5.13 mm. Here, an attempt is made to calculate how much variation X in the radius of curvature R of the lens this variation of 0.03 mm corrects.

Here, use is made of the design value of the lens in FIG. 3A. From $$0.0336 = \left( \frac{1}{-12.617} - \frac{1}{(-10.615+X)} \right) + \frac{(1.57228-1) \times 5.13}{1.57228 \times (-12.617) \times (-10.165+X)}$$

X=−0.008 mm.

That is, when for the design value R=−10.165 mm of the radius of curvature, the lens surface has been finished with R=−10.173 mm, it is also possible to vary the lens center thickness d by 0.03 mm from the design value and effect correction so as to provide the same optical performance.

Actually, however, this variation of X=−0.008mm is only of the order of Newton ring 0.3 (at d-ray λ=587.56 mm and measurement width 3 mm) of −10.165 mm of the design value R of the original radius of curvature, and this amount of X is not outside the range of amount which the optical designer generally gives as a tolerance, as the manufacturing error of the radius of curvature R.

Accordingly, the variation of 0.01–0.03 mm in the thickness created by the manufacturing error during molding and the variation of 0.05–0.5 mm in the thickness for correcting the error of the curvature of the lens surface are of different levels.

Figure 4:
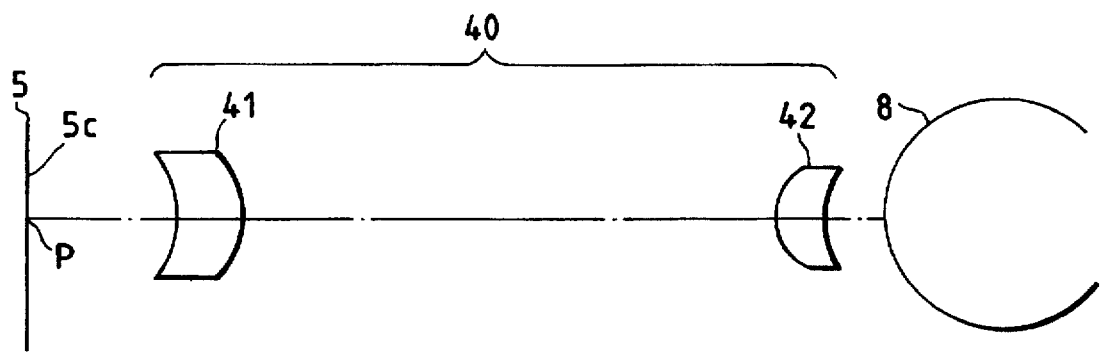
FIG. 4 is a schematic view of the essential portions in the sub-scanning cross-section of a portion of Embodiment 2 of the present invention.

FIG. 4 is a schematic view of the essential portions in the sub-scanning cross-section of Embodiment 2 of the present invention. In FIG. 4, reference numeral 41 designates an f-θ lens, and reference numeral 42 denotes a cylindrical lens made by molding and provided near the surface of the photosensitive drum 8.

In the present embodiment, the f-θ lens 41 and the cylindrical lens 42 are used as a scanning lens system 40 for imaging the reflected light from the light deflectively reflecting surface 5c on the surface of the photosensitive drum 8, and at this time, the cylindrical lens 42 as a regulation lens has its lens center thickness d varied in conformity with the condition of finish of the radius of curvature R of the lens surface, as in aforedescribed embodiment, to thereby adjust the refractive power of the entire scanning lens system.

Figure 5A:
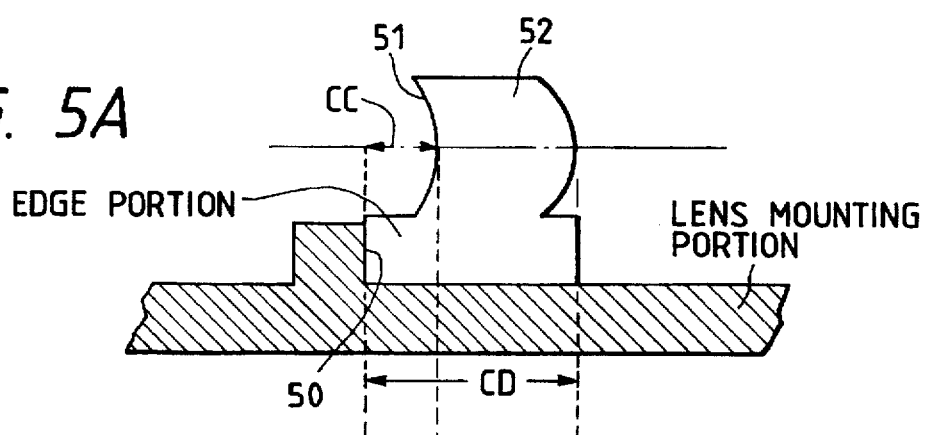
FIGS. 5A and 5B are illustrations of the regulation lens of Embodiment 3 of the present invention.
Figure 5B:
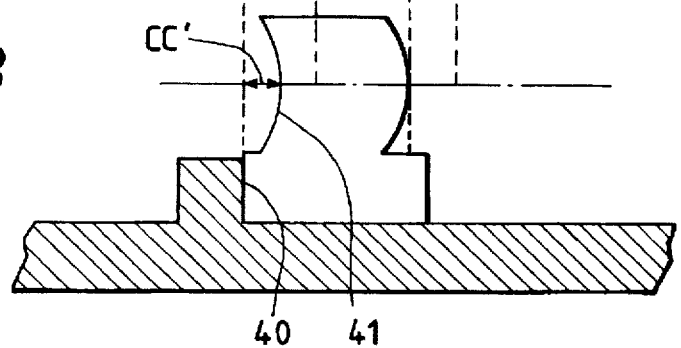

FIGS. 5A and 5B are illustrations of Embodiment 3 of a regulation lens 52 constituting the scanning lens system according to the present invention.

In FIGS. 5A and 5B, when the radius of curvature of the lens surface has varied from a reference value, the peripheral surface thickness of the lens in the direction of the optical axis thereof is varied from CD to CD' (actually, the distance CC from the end surface 40 of the peripheral surface to the optical surface 41 on the concave surface side is varied to CC').

Thereby the position of the lens 52 in the direction of the optical axis thereof is varied to thereby adjust the lens surface position so that the optically conjugate relation between the deflectively reflecting surface and the surface of the photosensitive drum provided by the scanning lens system may become constant.

That is, as shown in FIGS. 5A and 5B, according to the original optical design, the lens is disposed at the position of FIG. 5A, but when the radius of curvature R of the convex lens surface becomes blunt as previously described, the thickness of the peripheral surface in the direction of the optical axis is varied as shown in FIG. 5B, and the disposition of the lens is changed so that the lens may move rearwardly as viewed in FIGS. 5A and 5B, that is, come close to the light deflector 5, whereby the conjugate relation in the correction of inclination is kept constant.

Figure 8:
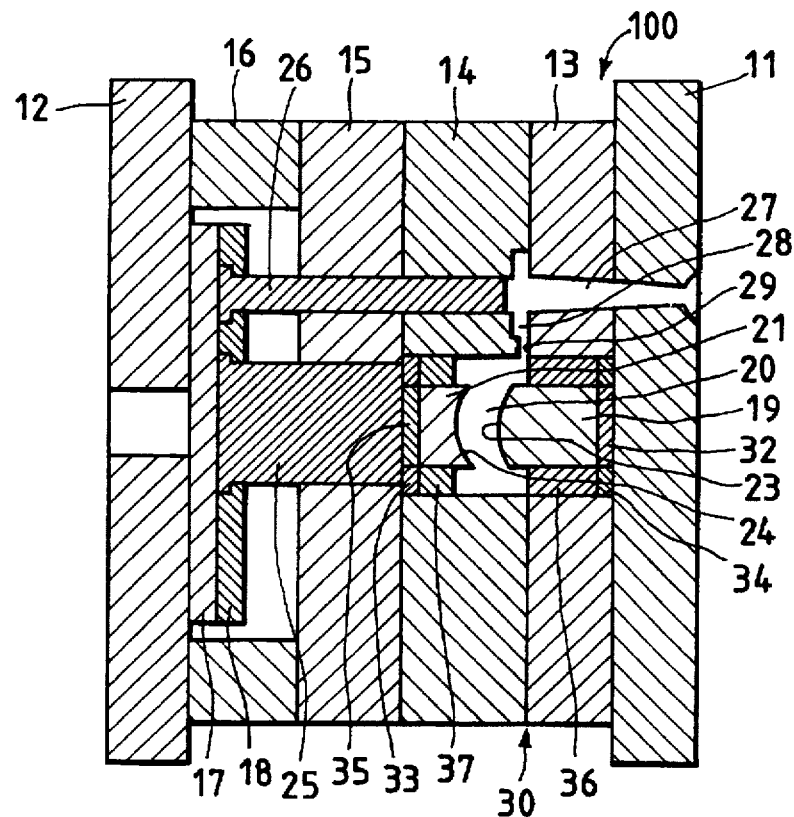
FIG. 8 is an illustration of a mold for molding the regulation lens according to the present invention.
Figure 9:
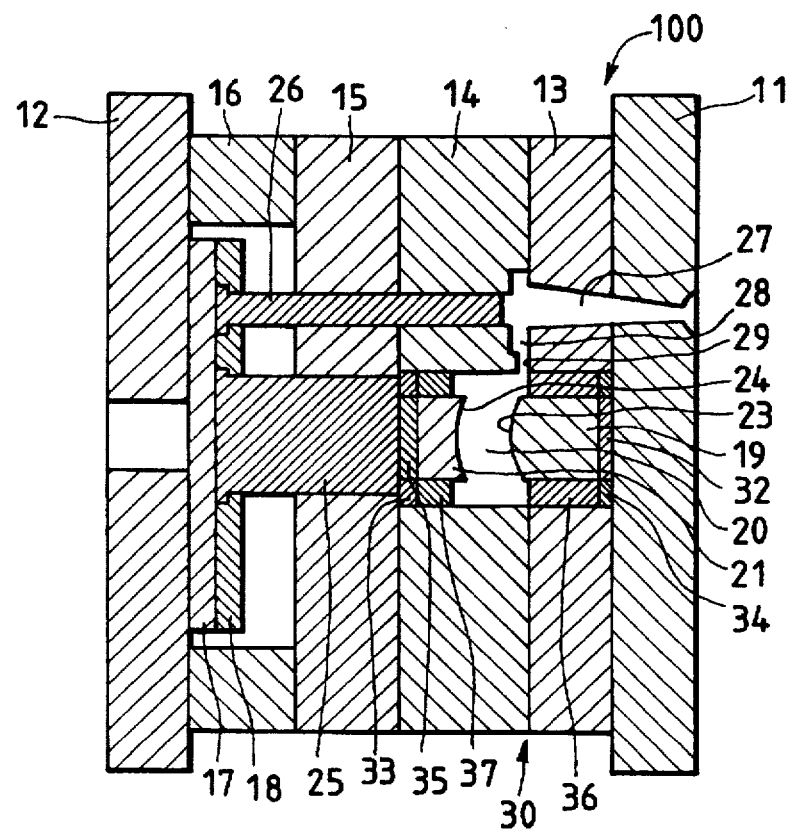
FIG. 9 is an illustration of a mold for molding the regulation lens according to the present invention.

FIGS. 8 and 9 are cross-sectional view of a mold 100 when in the present embodiment, the toric lens 52 is plastic-molded and the peripheral surface thickness thereof is varied.

In FIGS. 8 and 9, the same reference numerals are assigned to the same elements shown in FIGS. 6 and 7.

The peripheral surface portion of the lens shown in FIG. 5 is formed by the fixed side sleeve 36 and the movable side sleeve 37 of the mold 100 shown in FIGS. 8 and 9, and a fixed side mirror surface frame 19 and a movable side mirror surface frame 21 are contained within the respective sleeves.

As rings and spacers (liner) for adjusting the positions of the respective sleeves and respective mirror surface frames, a fixed side spacer (liner) 32 is at the back of the fixed side cavity insert block with mirror surface 19, a movable side spacer (liner) 35 is at the back of the movable side cavity insert block with mirror surface 21, a fixed side ring 34 is at the back of the fixed side sleeve 36, and a movable side ring 33 is at the back of the movable side sleeve 37.

The molding method is similar to that previously described, but when the R-shape of the molding surface 24 of the movable side cavity insert block with mirror surface 21 which is the convex surface side of the lens, i.e. the converse concave frame in the mold, has become blunter than the actual working target value determined by the optical design value, due to the mold working, the lens surface position must be changed as shown in FIG. 5B so that the optically conjugate relation may become constant, and this is achieved by replacing the fixed side spacer (liner) 32 with a thin one and reducing the amount of protrusion of the fixed side cavity insert block with mirror surface 19 from a parting surface 30, thereby changing the distance CC from the end surface 40 of the peripheral surface to the optical surface 41 on the concave surface side to CC'.

Also, even if the cavity insert block with mirror surface 19 and cavity insert block with mirror surface 21 as per the working target value have been formed in the molding working, when for example, the curvature of the convex surface side of the lens has become blunt by the molding, the fixed side spacer (liner) 32 is likewise replaced with a thin one and the amount of protrusion of the fixed side cavity insert block with mirror surface 19 from the parting surface 30 is reduced, thereby changing the distance from the end surface 40 of the edge to the optical surface 41 on the concave surface side to CC' as shown in FIG. 5B so that the conjugate relation may become constant.

The regulation lens in each of the above-described embodiment can be made by glass molding as well as by plastic molding.

According to the present invention, as described above, there can be achieved an optical scanning apparatus in which the lens center thickness or the lens surface position is appropriately set in conformity with the error of the curvature of the lens surface finished when the lens constituting the scanning lens system is made by plastic molding or glass molding, whereby the curvature accuracy of the lens surface can be alleviated and the correction of inclination can be effected well and also a high optical performance can be obtained easily.

Particularly, according to the present invention, the error of the curvature of the lens surface is corrected by the lens center thickness or the lens surface position to thereby make it possible to maintain the performance of the lens. Also, with regard to the sub-scanning direction of the inclination correcting system, a toric lens or a cylindrical lens is used and therefore, the curvature thereof becomes sharp and at the same time, the tolerance of the curvature is very severe, and such a lens of high accuracy becomes very difficult to make and thus, the present invention is especially effective.

Also, the error of the curvature is alleviated, whereby the manufacturing error of the mirror surface of the cavity insert block can be allowed and the application of a plastic-molded lens or a glass-molded lens becomes possible, and this is greatly effective for reducing costs. Also, with regard to the main scanning cross-section and the sub-scanning cross-section, if the correction lens for correcting the lens center thickness is formed into a meniscus shape toward the main scanning cross-section side, good adjustment will become possible with the deterioration of other performances reduced.

As regards lenses which require a number of molds and high accuracy for plastic molding or glass molding, there can be obtained lenses of stable performance, and unlike lenses made by polishing, there can be easily obtained lenses differing in lens center thickness or lens surface position simply by changing the incorporated position of the cavity insert block with mirror surface in molding.

What is claimed is:

1. A scanning lens system for guiding a light beam deflected by a light deflector to a surface to be scanned, comprising:

a lens having two lens surfaces, an optical performance of said lens being corrected by varying the lens center thickness from a design value in conformity with an error of curvatures of the lens surfaces, wherein when the radii of curvature of the lens surfaces of said lens on the light deflector side and the surface to be scanned side in the sub-scanning cross-section are $R_a$ and $R_b$, respectively, the following condition is satisfied:

$$0.0004 < |1/(R_a \times R_b)| < 0.004.$$

2. A scanning lens system according to claim 1, wherein the error of the curvatures is an amount of deviation from a design value.

3. A scanning lens system according to claim 1, wherein said lens is manufactured by molding by use of a mold.

4. A scanning lens system according to claim 1, wherein said lens is of a meniscus shape having its convex surface facing the surface to be scanned in the sub-scanning cross-section.

5. A scanning lens system according to claim 1, wherein said scanning lens system is arranged such that the deflectively reflecting surface of said light deflector and the surface to be scanned are made substantially optically conjugate with each other in the sub-scanning cross-section.

6. A scanning lens system according to claim 1, wherein said scanning lens system is used for an optical scanning apparatus.

7. A scanning lens system according to claim 1, wherein said scanning lens system is used for a laser beam printer.

8. A scanning lens system for guiding a light beam deflected by a light deflector to a surface to be scanned, comprising:

a lens having two lens surfaces, wherein when the radii of curvature of the lens surfaces of said lens on the light deflector side and the surface to be scanned side in the sub-scanning cross-section are $R_a$ and $R_b$, respectively, and the lens center thickness is d, and a refractive index of material of said lens for a wavelength λ used is N, and a constant K is put at $$K = \left( \frac{1}{R_a} - \frac{1}{R_b} \right) + \frac{(N-1)d}{N \times R_a \times R_b}$$

the lens center thickness d is varied from a design value in conformity with an error of curvatures in the radii of curvature $R_a$ and $R_b$ of the lens surfaces so that the constant K may be within ±2% relative to a reference value.

9. A scanning lens system according to claim 8, wherein the error of the curvatures is an amount of deviation from a design value.

10. A scanning lens system according to claim 8, wherein said lens is manufactured by molding by use of a mold.

11. A scanning lens system according to claim 8, wherein said lens is of a meniscus shape having its convex surface facing the surface to be scanned in the sub-scanning cross-section.

12. A scanning lens system according to claim 8, wherein said scanning lens system is arranged such that the deflectively reflecting surface of said light deflector and the surface to be scanned are made substantially optically conjugate with each other in the sub-scanning cross-section.

13. A scanning lens system according to claim 8, wherein said scanning lens system is used for an optical scanning apparatus.

14. A scanning lens system according to claim 8, wherein said scanning lens system is used for a laser beam printer.

* * * * *

UNITED STATES PATENT AND TRADEMARK OFFICE
CERTIFICATE OF CORRECTION

PATENT NO. : 5,696,621
DATED : December 9, 1997
INVENTOR(S) : HIROSHI NAKANISHI, ET AL.

It is certified that error appears in the above-identified patent and that said Letters Patent is hereby corrected as shown below:

COLUMN 1

Line 35, "Surface" should read --surface--.

COLUMN 2

Line 7, "incert" should read --insert--.

COLUMN 7

Line 8, "with" should read --with a--.
Line 10, "represent" should read --represented--.
Line 11, "represent" should read --represented--.

UNITED STATES PATENT AND TRADEMARK OFFICE
CERTIFICATE OF CORRECTION

PATENT NO. : 5,696,621
DATED : December 9, 1997
INVENTOR(S) : HIROSHI NAKANISHI, ET AL.

It is certified that error appears in the above-identified patent and that said Letters Patent is hereby corrected as shown below:

COLUMN 9

Line 22, "view" should read --views--.

COLUMN 10

Line 2, "embodiment" should read --embodiments--.

Signed and Sealed this

Thirteenth Day of October 1998

Attest:

BRUCE LEHMAN

Attesting Officer

Commissioner of Patents and Trademarks